(12) United States Patent
Tajima et al.

(10) Patent No.: US 10,611,360 B2
(45) Date of Patent: Apr. 7, 2020

(54) ELECTRIC POWER SOURCE SYSTEM

(71) Applicant: TOYOTA JIDOSHA KABUSHIKI KAISHA, Toyota-shi, Aichi-ken (JP)

(72) Inventors: Yasuhiro Tajima, Nisshin (JP); Mitsuhiro Miura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/870,006

(22) Filed: Jan. 12, 2018

(65) Prior Publication Data
US 2018/0215371 A1 Aug. 2, 2018

(30) Foreign Application Priority Data

Jan. 31, 2017 (JP) .................................. 2017-015673

(51) Int. Cl.
*H02J 7/10* (2006.01)
*B60W 10/26* (2006.01)
(Continued)

(52) U.S. Cl.
CPC .............. *B60W 10/26* (2013.01); *B60L 7/10* (2013.01); *B60L 53/00* (2019.02); *B60L 53/22* (2019.02); *B60L 58/20* (2019.02); *H01M 10/44* (2013.01); *H02J 7/007* (2013.01); *H02J 7/1423* (2013.01); *H02J 7/1438* (2013.01); *H02J 7/1461* (2013.01); *B60L 2210/12* (2013.01); *B60L 2210/14* (2013.01); *H01M 10/0525* (2013.01); *H01M 10/06* (2013.01); *H01M 16/00* (2013.01); *H01M 2220/20* (2013.01);
(Continued)

(58) Field of Classification Search
CPC ..................................................... H02J 7/1438
USPC ................................................. 320/104–105
See application file for complete search history.

(56) References Cited

U.S. PATENT DOCUMENTS 9,184,624 B2 * 11/2015 Froeschl ................... H02J 1/08
2004/0112320 A1 * 6/2004 Bolz ....................... F02N 11/04
123/179.28
(Continued)

FOREIGN PATENT DOCUMENTS

| JP | 2004-222362 A | 8/2004 |
|---|---|---|
| JP | 2008-278564 A | 11/2008 |
| JP | 2011-250514 A | 12/2011 |
| JP | 2013-162645 A | 8/2013 |

(Continued)

*Primary Examiner* — Samuel Berhanu
(74) *Attorney, Agent, or Firm* — Oliff PLC

(57) ABSTRACT

An electric power source system includes an electric power generator, a voltage conversion device, a battery, an electrical load, and a control device. The voltage conversion device converts a direct current voltage. The battery is electrically connected to the electric power generator through the voltage conversion device. The electrical load is electrically connected to the electric power generator in a parallel relationship with the battery without passing through the voltage conversion device. The control device is configured to charge the battery through the voltage conversion device based on regenerative electric power in a regenerative state in which the regenerative electric power is generated by the electric power generator. the control device is configured to increase an electric power consumption of the electrical load further when the control device detects an event that impedes the charging in the regenerative state than when the control device does not detect the event.

8 Claims, 10 Drawing Sheets

(51) Int. Cl.
  *B60L 7/10* (2006.01)
  *H01M 10/44* (2006.01)
  *H02J 7/00* (2006.01)
  *H02J 7/14* (2006.01)
  *B60L 53/22* (2019.01)
  *B60L 58/20* (2019.01)
  *B60L 53/00* (2019.01)
  *H01M 10/06* (2006.01)
  *H01M 10/0525* (2010.01)
  *H01M 16/00* (2006.01)

(52) U.S. Cl.
  CPC ........... *Y02E 60/122* (2013.01); *Y02E 60/126* (2013.01); *Y02T 10/7011* (2013.01); *Y02T 10/7066* (2013.01); *Y02T 10/7072* (2013.01); *Y02T 10/7225* (2013.01); *Y02T 10/7233* (2013.01); *Y02T 90/127* (2013.01); *Y02T 90/14* (2013.01)

(56) References Cited

U.S. PATENT DOCUMENTS

| | | | |
|---|---|---|---|
| 2006/0113799 A1* | 6/2006 | Obayashi | F01N 5/04 290/40 B |
| 2006/0156096 A1* | 7/2006 | Sato | B60L 11/12 714/724 |
| 2007/0252584 A1* | 11/2007 | Imamura | H02J 7/1438 320/104 |
| 2010/0116565 A1* | 5/2010 | Jang | H02S 10/40 180/2.2 |
| 2011/0285206 A1 | 11/2011 | Sato et al. | |
| 2015/0251544 A1* | 9/2015 | Sugiyama | B60L 1/00 307/10.6 |
| 2016/0059722 A1* | 3/2016 | Nate | B60L 11/1824 320/109 |

FOREIGN PATENT DOCUMENTS

JP 2015-162947 A 9/2015
WO 2004/064235 A2 7/2004

\* cited by examiner

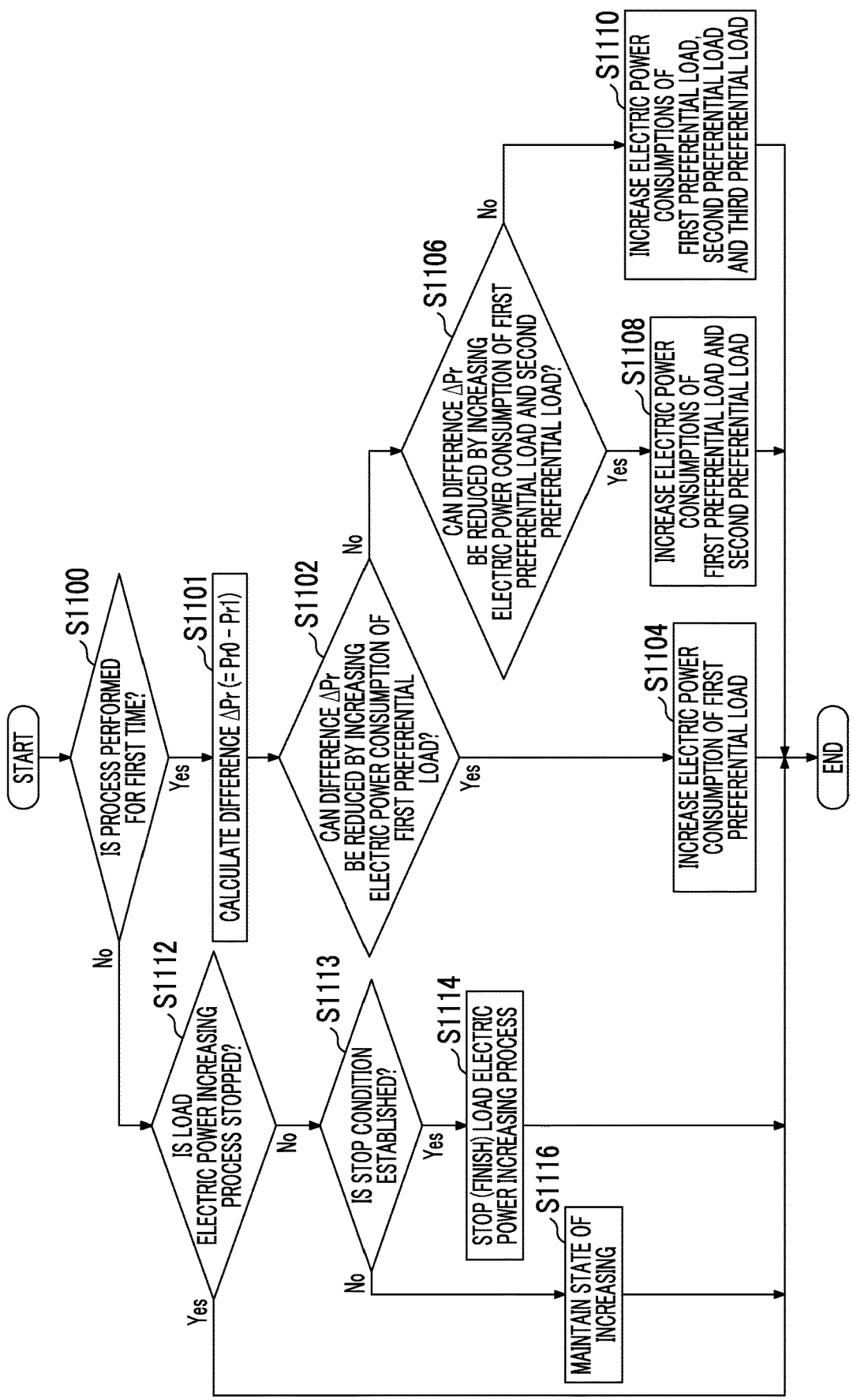

ELECTRIC POWER SOURCE SYSTEM

INCORPORATION BY REFERENCE

The disclosure of Japanese Patent Application No. 2017-015673 filed on Jan. 31, 2017 including the specification, drawings and abstract is incorporated herein by reference in its entirety.

BACKGROUND

1. Technical Field

The present disclosure relates to an electric power source system.

2. Description of Related Art

In a known technology (refer to, for example, Japanese Unexamined Patent Application Publication No. 2013-162645 (JP 2013-162645 A)), the electric power of an auxiliary device that is consumed as electric power regenerable by an electric motor is restricted with a predetermined upper limit value of the electric power of the auxiliary device determined in accordance with a vehicle speed, when a traveling condition that the deceleration of a vehicle is changed due to a decrease in the electric power consumption of the auxiliary device is established during execution of cooperative regenerative brake control.

SUMMARY

In a regenerative state in which regenerative electric power is generated by an electric power generator, when an event that impedes charging (hereinafter, referred to as a "charging impeding event") suddenly occurs under a situation in which a battery is being charged through a DC-DC converter (a voltage conversion device that operates with a direct current) based on the regenerative electric power, the regenerative electric power is reduced by an amount corresponding to a decrease in electric power received in the battery before and after the occurrence of the charging impeding event. When such a rapid change in regenerative electric power occurs, the deceleration of the vehicle is changed due to the rapid change, and drivability may deteriorate.

The present disclosure provides an electric power source system that reduces deterioration of drivability due to a rapid change in regenerative electric power caused by a charging impeding event in a regenerative state.

An aspect of the present disclosure relates to an electric power source system that is mounted in a vehicle. The electric power source system includes an electric power generator, a voltage conversion device, a battery, an electrical load, and a control device. The electric power generator is mechanically connected to an engine. The voltage conversion device converts a direct current voltage. The battery is electrically connected to the electric power generator through the voltage conversion device. The electrical load is electrically connected to the electric power generator in a parallel relationship with the battery without passing through the voltage conversion device. The control device is configured to charge the battery through the voltage conversion device based on regenerative electric power in a regenerative state in which the regenerative electric power is generated by the electric power generator. The control device is configured to increase an electric power consumption of the electrical load further when the control device detects an event that impedes the charging in the regenerative state than when the control device does not detect the event.

According to the aspect of the present disclosure, when an event that impedes charging in the regenerative state is detected, the electric power consumption of an electrical load group is increased further than when the event is not detected. The event that impedes charging may occur due to, for example, a malfunction of a DC-DC converter or a malfunction of the battery. In such a case, the electric power consumption of the electrical load group is increased, and deterioration of drivability due to a rapid change in regenerative electric power caused by a charging impeding event can be reduced.

The electric power source system according to the aspect of the present disclosure may further include a lead battery. The battery may be a lithium ion battery. The lead battery may be electrically connected to the electric power generator in a parallel relationship with the lithium ion battery without passing through the voltage conversion device.

According to the aspect of the present disclosure, deterioration of drivability due to a rapid change in regenerative electric power caused by the charging impeding event can be reduced in, for example, a dual electric power source system in which the battery is a lithium ion battery having a higher voltage than the lead battery. Charging the lithium ion battery through the DC-DC converter accompanies stepping up of a voltage and needs a comparatively large amount of electric power. Thus, when the charging impeding event occurs, a rapid change in regenerative electric power occurs easily. Accordingly, the effect is more advantageous.

In the electric power source system according to the aspect of the present disclosure, a plurality of the electrical loads may be disposed.

In the electric power source system according to the aspect of the present disclosure, the electrical loads may include a first electrical load having a predetermined first characteristic and a second electrical load having a predetermined second characteristic. The control device may be configured to increase the electric power consumptions of the electrical loads in a manner that preferentially uses the first electrical load over the second electrical load when the control device detects the event in the regenerative state. The first electrical load may be a load of which a behavior at a time of increase in electric power consumption is more difficulty recognized by an occupant than the second electrical load. According to the aspect of the present disclosure, the electric power consumption of the electrical load group can be increased in a manner not easily recognized by the occupant according to the characteristic of each electrical load included in the electrical load group.

In the electric power source system according to the aspect of the present disclosure, the second electrical load may include an air conditioning device for a backseat, a seat heater for the backseat, an air cleaning system for a front seat, or an air cleaning system for the backseat.

In the electric power source system according to the aspect of the present disclosure, the electrical load may consume electric power under control of the control device.

In the electric power source system according to the aspect of the present disclosure, the event may include a malfunction of the voltage conversion device or a malfunction of the battery.

According to the aspect of the present disclosure, an electric power source system that reduces deterioration of drivability due to a rapid change in regenerative electric power caused by a charging impeding event in a regenerative state can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 11 is a schematic flowchart illustrating another example of the load electric power increasing process that uses the load characteristic map.

DETAILED DESCRIPTION OF EMBODIMENTS

Hereinafter, an embodiment will be described in detail with reference to the appended drawings.

Figure 1:
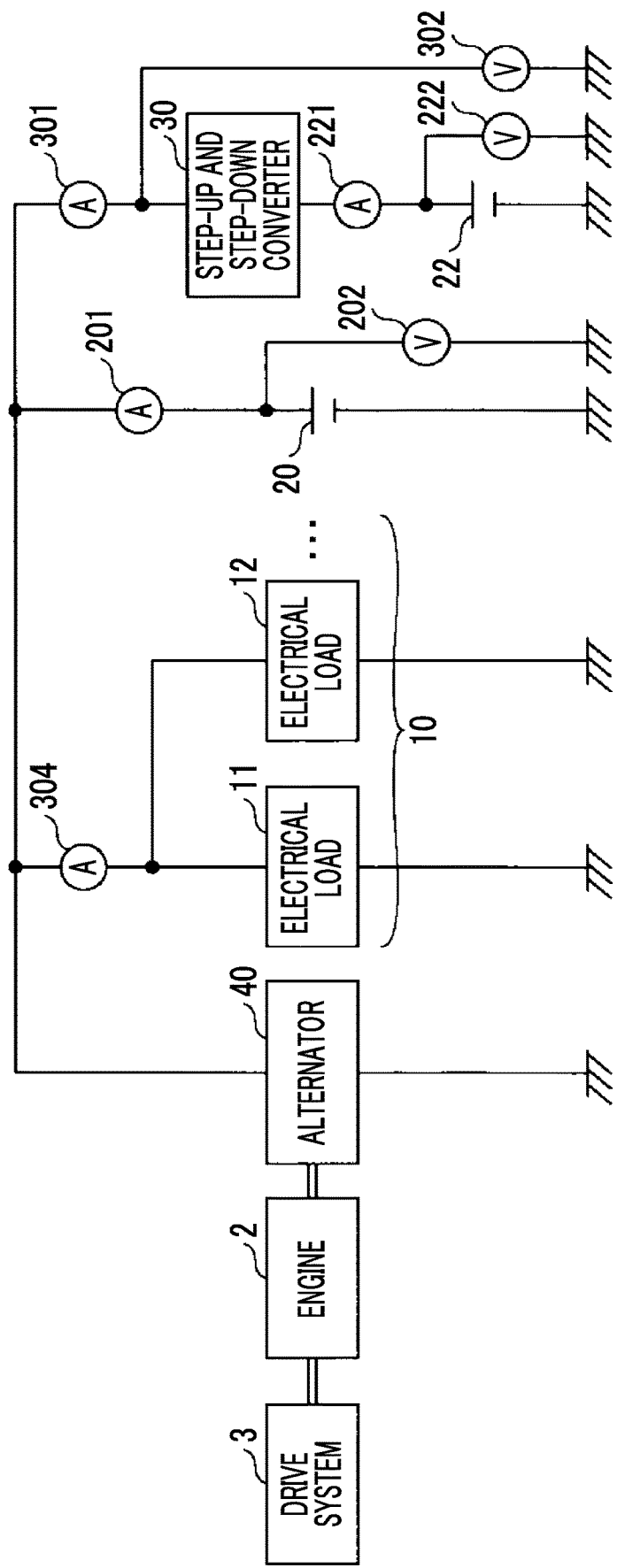
FIG. 1 is a diagram illustrating a schematic electric circuit configuration of an electric power source system.

FIG. 1 is a diagram illustrating a schematic electric circuit configuration of an electric power source system 1. The electric power source system 1 is mounted in a vehicle that includes an engine 2 as a drive source. A drive system 3 such as a transmission is mechanically connected to the engine 2.

The electric power source system 1 includes an electrical load group 10, a lead battery 20, a lithium ion battery 22, a DC-DC converter 30 (hereinafter, referred to as a "step-up and step-down converter 30"), and an alternator 40. The step-up and step-down converter 30 is a voltage conversion device that converts the voltage of a direct current.

The electrical load group 10 includes a plurality of electrical loads 11, 12 of a low voltage system that is supplied with electric power from the lead battery 20. While the electrical load group 10 includes two electrical loads 11, 12 in the example illustrated in FIG. 1, the electrical load group 10 may include more electrical loads in actuality. The electrical load group 10 basically operates independently of a control device 70. However, in a specific case as described below, the electrical load group 10 consumes electric power based on an instruction from the control device 70. That is, when a load electric power increasing process described below is executed, the electrical load group 10 adjusts electric power consumption based on the instruction from the control device 70.

The rated voltage of the lead battery 20 is, for example, 12 V.

The rated voltage of the lithium ion battery 22 is, for example, 24 V or 48 V. The lithium ion battery 22 and the step-up and step-down converter 30 are disposed in parallel with the lead battery 20 and the electrical load group 10.

When the step-up and step-down converter 30 performs a step-up operation, the step-up and step-down converter 30 steps up a voltage generated by the alternator 40 and charges the lithium ion battery 22 with the stepped-up voltage. When the step-up and step-down converter 30 performs a step-down operation, the step-up and step-down converter 30 steps down the voltage of the lithium ion battery 22 and outputs the stepped-down voltage to a low voltage side (toward the lead battery 20 and the electrical load group 10).

The alternator 40 is mechanically connected to the engine 2. The alternator 40 is an electric power generator that generates electric power by using the power of the engine 2. The electric power generated by the alternator 40 is used for charging the lead battery 20 or the lithium ion battery 22, operating the electrical load group 10, and the like.

The electric power source system 1 further includes a current sensor 201, a voltage sensor 202, a current sensor 221, and a voltage sensor 222. The current sensor 201 detects the charging or discharging current of the lead battery 20. The voltage sensor 202 detects the voltage of the lead battery 20. The current sensor 221 detects the charging or discharging current of the lithium ion battery 22. The voltage sensor 222 detects the voltage of the lithium ion battery 22. The electric power source system 1 further includes a current sensor 301 and a voltage sensor 302. The current sensor 301 detects the output current of the step-up and step-down converter 30. The voltage sensor 302 detects the output voltage of the step-up and step-down converter 30. The current sensor 301 and the voltage sensor 302 may be incorporated in the step-up and step-down converter 30. The electric power source system 1 further includes a current sensor 304 that detects a load current flowing in the electrical load group 10.

Figure 2:
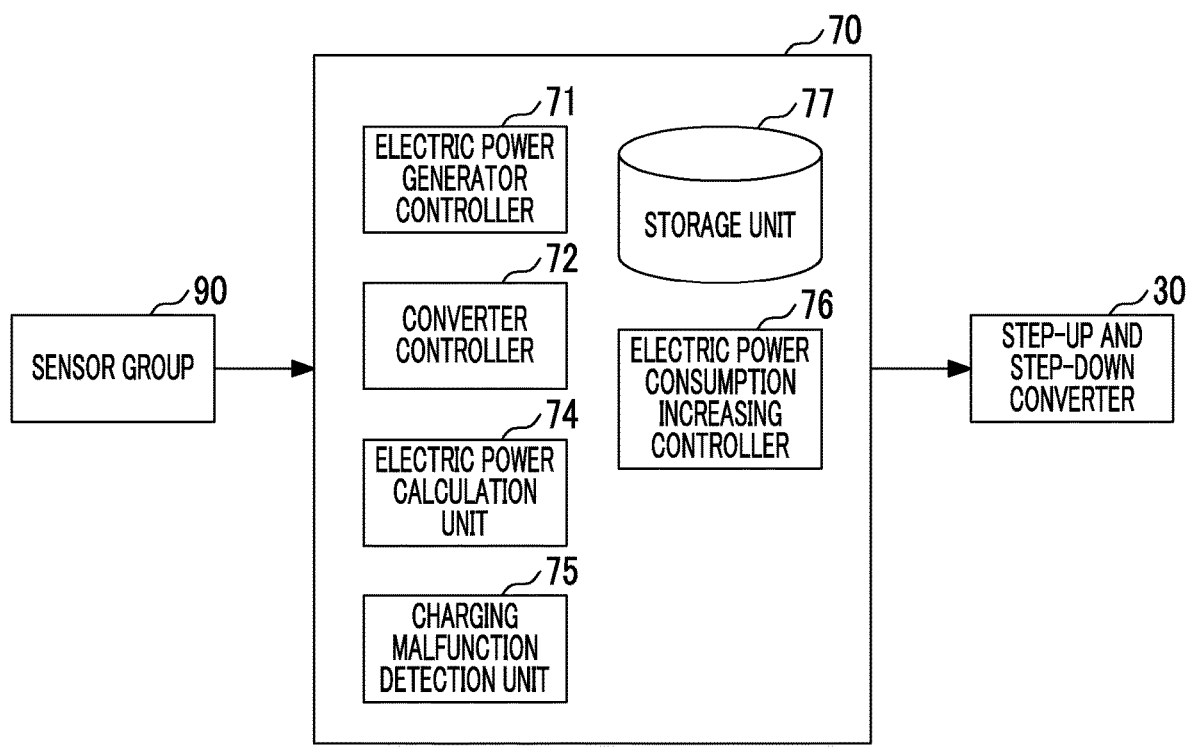
FIG. 2 is a diagram illustrating a schematic configuration of a control system of the electric power source system.

FIG. 2 is a diagram illustrating a schematic configuration of a control system of the electric power source system 1. The electric power source system 1 includes the control device 70. The control device 70 is realized by an electronic control unit (ECU) that includes a microcomputer and an integrated circuit (IC). A sensor group 90 and the step-up and step-down converter 30 are connected to the control device 70. The sensor group 90 includes the current sensors 201, 221, 301, 304 and the voltage sensors 202, 222, 302.

The control device 70 includes an electric power generator controller 71, a converter controller 72, an electric power calculation unit 74, a charging malfunction detection unit 75, an electric power consumption increasing controller 76, and a storage unit 77. The electric power generator controller 71, the converter controller 72, the electric power calculation unit 74, the charging malfunction detection unit 75, and the electric power consumption increasing controller 76 are realized by a microcomputer (that is, realized by a CPU of a microcomputer executing a program stored in a ROM or the like). The storage unit 77 is realized by a memory such as a flash memory of a microcomputer.

The electric power generator controller 71 controls the generated voltage of the electric power generator in accordance with the traveling state of the vehicle (charging control). The charging control includes normal charging control and event charging control.

In the normal charging control, the electric power generator controller 71 determines the generated voltage (specified generated voltage) of the alternator 40 based on the vehicle traveling state and the state of charge (SOC) of the lead battery 20, and provides a control signal corresponding to the specified generated voltage to the alternator 40. The vehicle traveling state is, for example, a vehicle stoppage state, an acceleration state, a steady vehicle speed state, or a deceleration state. Any method may be used for determining the generated voltage of the alternator 40 corresponding to the vehicle traveling state. In the present embodiment, for example, when the vehicle traveling state is the steady vehicle speed state (a state in which the vehicle speed is approximately constant), the electric power generator controller 71 specifies the generated voltage of the alternator 40 such that the SOC of the lead battery 20 becomes equal to a constant value a (<100%) (for example, specified generated voltage=12.5 V to 13.8 V). When the vehicle traveling state is the acceleration state, the electric power generator controller 71 substantially stops the alternator 40 generating electric power in order to increase the acceleration capability of the vehicle. When the vehicle traveling state is the deceleration state, the electric power generator controller 71 generates regenerative electric power by the alternator 40 (in the present example, specified generated voltage=14.8 V). Hereinafter, a state in which regenerative electric power is generated by the alternator 40 will be referred to as a "regenerative state", and electric power generated by the alternator 40 in the regenerative state will be referred to as "regenerative electric power".

The event charging control is executed after a transition is made to a state in which a lithium battery charging impeding event described below is detected. The event charging control has a different control method from the normal charging control in the deceleration state. For example, in the event charging control, the electric power generator controller 71 specifies the generated voltage of the alternator 40 in the deceleration state such that the SOC of the lead battery 20 becomes equal to the constant value a (<100%), in the same manner as in the steady vehicle speed state.

The converter controller 72 determines a target value of the output voltage of the step-up and step-down converter 30 during the normal charging control performed by the electric power generator controller 71. The converter controller 72 controls the output voltage of the step-up and step-down converter 30 such that the target value of the output voltage is realized. For example, the converter controller 72 generates a drive signal corresponding to the target value by pulse width modulation (PWM) control, and applies the drive signal to the gate of each switching element (not illustrated) of the step-up and step-down converter 30.

In the regenerative state, the converter controller 72 charges the lithium ion battery 22 through the step-up and step-down converter 30 based on the regenerative electric power. That is, in the regenerative state, the converter controller 72 charges the lithium ion battery 22 by the step-up operation performed by the step-up and step-down converter 30.

The converter controller 72 stops the operation of the step-up and step-down converter 30 during the event charging control performed by the electric power generator controller 71.

The electric power calculation unit 74 calculates the electric power consumption of the electrical load group 10 (hereinafter, referred to as "load electric power"). The electric power calculation unit 74 calculates the load electric power based on information from the current sensor 304 and the voltage sensor 202. The electric power calculation unit 74 calculates electric power charging the lead battery 20 (hereinafter, referred to as "first charging electric power") based on information from the current sensor 201 and the voltage sensor 202. The electric power calculation unit 74 calculates electric power charging the lithium ion battery 22 (hereinafter, referred to as "second charging electric power") based on information from the current sensor 301 and the voltage sensor 302.

In the regenerative state, the charging malfunction detection unit 75 detects an event that impedes the lithium ion battery 22 being charged through the step-up and step-down converter 30 (hereinafter, referred to as a "lithium battery charging impeding event"). The lithium battery charging impeding event is caused by, for example, a malfunction of the step-up and step-down converter 30 or a malfunction of the lithium ion battery 22. The malfunction of the step-up and step-down converter 30 may include a partial malfunction of the step-up and step-down converter 30. For example, when the step-up and step-down converter 30 is a multiphase type, the partial malfunction of the step-up and step-down converter 30 includes a malfunction of a part of the phases. The charging malfunction detection unit 75 may detect the lithium battery charging impeding event when a malfunction voltage value (an excessively high voltage value or an excessively low voltage value) is acquired from the voltage sensor 302 continuously for a certain time period. Alternatively, the charging malfunction detection unit 75 may detect the lithium battery charging impeding event when a malfunction temperature value (an excessively high temperature value or an excessively small temperature value) is acquired continuously for a certain time period from a thermistor (not illustrated) that detects the temperature of the lithium ion battery 22.

When the charging malfunction detection unit 75 detects the lithium battery charging impeding event, the electric power consumption increasing controller 76 performs a load electric power increasing process that increases the load electric power further than when the event is not detected. The load electric power increasing process may include, for example, operating the electrical load of the electrical load group 10 that is not in operation at the time of detection of the lithium battery charging impeding event, and increasing the output of the electrical load of the electrical load group 10 that is in operation at the time of detection of the lithium battery charging impeding event. The load electric power increasing process will be described in detail below.

According to the present embodiment, the load electric power is increased when the lithium battery charging impeding event is detected in the regenerative state. Thus, a change in regenerative electric power due to the lithium battery charging impeding event can be reduced before and after the occurrence of the lithium battery charging impeding event. Accordingly, deterioration of drivability (for example, deterioration of drivability due to a change in the deceleration of the vehicle) caused by a rapid change in regenerative electric power (that is, a rapid change in the torque of the alternator 40) due to the lithium battery charging impeding event in the regenerative state can be reduced.

Next, an example of operation of the control device 70 will be described with reference to FIG. 3.

Figure 3:
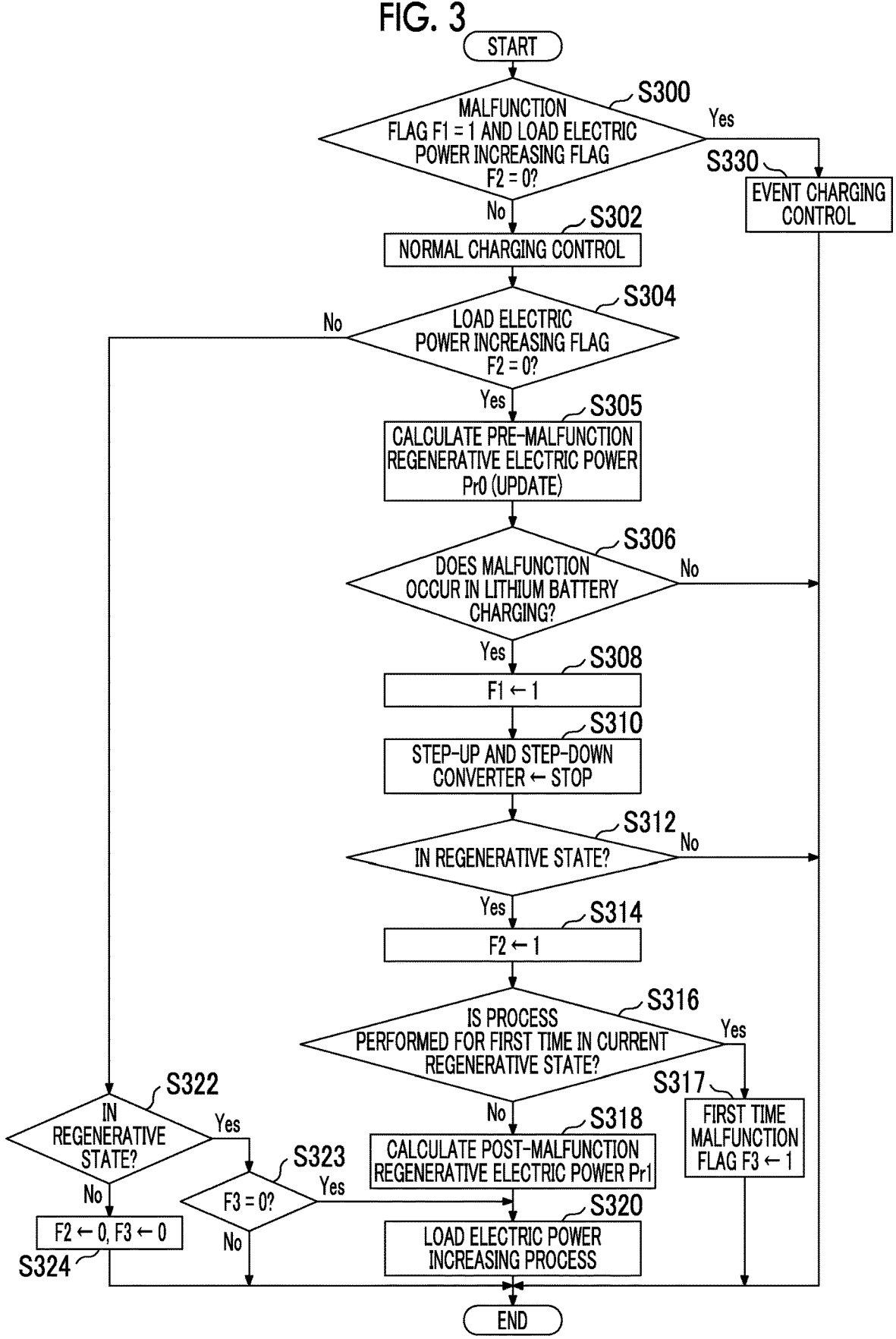
FIG. 3 is a schematic flowchart illustrating a summary of an example of operation of a control device.

FIG. 3 is a schematic flowchart illustrating a summary of an example of operation of the control device 70. The process in FIG. 3 is executed at predetermined cycles when, for example, an ignition switch is in an ON state.

In step S300, the electric power generator controller 71 determines whether or not a malfunction flag F1 is equal to "1", and a load electric power increasing flag F2 is equal to "0". The malfunction flag F1 being equal to "1" indicates a state in which the lithium battery charging impeding event is already detected (a state in which the lithium battery charging impeding event is not resolved). The initial value of the malfunction flag F1 is "0". When the malfunction flag F1 becomes equal to "1", the malfunction flag F1 may be maintained at "1" until the malfunction flag F1 is reset to "0" by repairing or the like. The load electric power increasing flag F2 being equal to "0" indicates a state in which the load electric power increasing process is not needed. The load electric power increasing flag F2 being equal to "1" indicates a state in which the load electric power increasing process may be needed. The initial value of the load electric power increasing flag F2 is "0". When the determination result is "YES" in step S300, a transition is made to step S330. Otherwise (that is, when the malfunction flag F1 is equal to "0", or the load electric power increasing flag F2 is equal to "1"), a transition is made to step S302.

In step S302, the electric power generator controller 71 performs the normal charging control. The normal charging control is as described above.

In step S304, the electric power generator controller 71 determines whether or not the load electric power increasing flag F2 is equal to "0". When the determination result is "YES" in step S304, a transition is made to step S305. Otherwise, a transition is made to step S322.

In step S305, the electric power calculation unit 74 calculates the load electric power, the first charging electric power, and the second charging electric power. A method of calculating the load electric power, the first charging electric power, and the second charging electric power is as described above. The electric power calculation unit 74 calculates current regenerative electric power Pr0 (hereinafter, referred to as "pre-malfunction regenerative electric power Pr0") by finding the total of the load electric power, the first charging electric power, and the second charging electric power.

In step S306, the charging malfunction detection unit 75 determines whether or not the lithium battery charging impeding event occurs. A method of detecting the lithium battery charging impeding event is as described above. When the determination result is "YES" in step S306, a transition is made to step S308. Otherwise, the current cycle of the process is finished.

In step S308, the charging malfunction detection unit 75 sets the malfunction flag F1 to "1".

In step S310, the converter controller 72 stops the step-up and step-down converter 30. The converter controller 72 may perform a process for recovering from the malfunction of the step-up and step-down converter 30 or the lithium ion battery 22, or other protection processes.

In step S312, the charging malfunction detection unit 75 determines whether or not the vehicle traveling state is the regenerative state. When the determination result is "YES" in step S312, a transition is made to step S314. Otherwise, the current cycle of the process is finished.

In step S314, the charging malfunction detection unit 75 sets the load electric power increasing flag F2 to "1".

In step S316, the charging malfunction detection unit 75 determines whether or not the process is performed for the first time in the current regenerative state. When the determination result is "YES" in step S316, a transition is made to step S317. Otherwise, a transition is made to step S318.

In step S317, the charging malfunction detection unit 75 sets a first time malfunction flag F3 to "1". The first time malfunction flag F3 being equal to "1" indicates that the lithium battery charging impeding event occurs in the process that is performed for the first time in the current regenerative state. The initial value of the first time malfunction flag F3 is "0".

In step S318, the electric power calculation unit 74 calculates the load electric power and the first charging electric power. A method of calculating the load electric power and the first charging electric power is as described above. The electric power calculation unit 74 calculates current regenerative electric power Pr1 (hereinafter, referred to as "post-malfunction regenerative electric power Pr1") after detection of the lithium battery charging impeding event by finding the total of the load electric power and the first charging electric power.

In step S320, the electric power consumption increasing controller 76 performs the load electric power increasing process based on the most recent pre-malfunction regenerative electric power Pr0 acquired in step S305 and the most recent post-malfunction regenerative electric power Pr1 acquired in step S318. For example, the electric power consumption increasing controller 76 performs the load electric power increasing process such that the difference between the pre-malfunction regenerative electric power Pr0 and the post-malfunction regenerative electric power Pr1 is approximately zero. A more specific example of the load electric power increasing process will be described below.

In step S322, the charging malfunction detection unit 75 determines whether or not the vehicle traveling state is the regenerative state. When the determination result is "YES" in step S322, a transition is made to step S323. Otherwise, a transition is made to step S324.

In step S323, the charging malfunction detection unit 75 determines whether or not the first time malfunction flag F3 is equal to "0". When the determination result is "YES" in step S323, a transition is made to step S320. Otherwise, the current cycle of the process is finished.

In step S324, the load electric power increasing process performed by the electric power consumption increasing controller 76 is stopped. The charging malfunction detection unit 75 resets the load electric power increasing flag F2 to "0", and maintains or resets the first time malfunction flag F3 to "0". When the regenerative state in which the load electric power increasing process is executed is finished, the load electric power increasing flag F2 is reset to "0".

In step S330, the electric power generator controller 71 performs the event charging control. The event charging control is as described above. During the event charging control, an alert may be output on a meter (not illustrated) or the like in order to prompt an occupant to perform repairing or the like for the lithium battery charging impeding event.

According to the process illustrated in FIG. 3, the load electric power increasing process is executed when the lithium battery charging impeding event is detected in the regenerative state. Thus, deterioration of drivability due to the lithium battery charging impeding event can be reduced.

Figure 4:
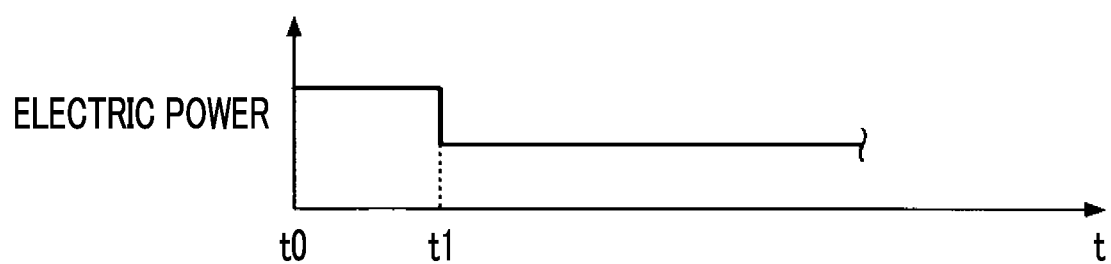
FIG. 4 is a diagram schematically illustrating one example of a time series of each state quantity when a lithium battery charging impeding event is detected in a regenerative state.
Figure 4:
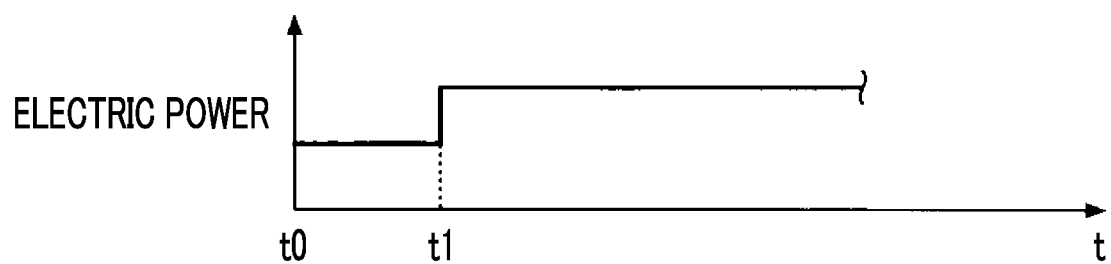
Figure 4:
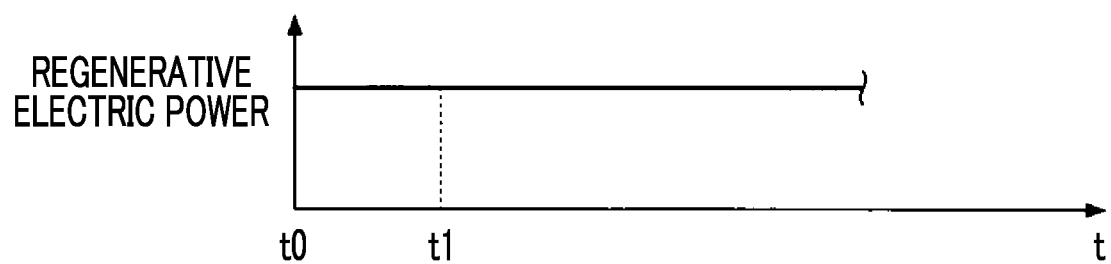

FIG. 4 is a conceptual descriptive diagram of the effect of the process illustrated in FIG. 3, and is a diagram schematically illustrating one example of a time series of each state quantity when the lithium battery charging impeding event is detected in the regenerative state. FIG. 4 illustrates a time series of the second charging electric power, the load electric power, and the regenerative electric power in order from the top.

FIG. 4 illustrates a case in which the regenerative state is started at time t0, and the lithium battery charging impeding event is detected in the regenerative state at time t1. As illustrated in FIG. 4, when the lithium battery charging impeding event is detected at time t1, the second charging electric power is rapidly decreased. However, the load electric power is increased due to execution of the load electric power increasing process. That is, the decrease in the second charging electric power is counterbalanced by the increase in load electric power. Consequently, the regenerative electric power is not significantly rapidly changed in the regenerative state, and deterioration of drivability can be reduced.

Next, several specific examples of the load electric power increasing process will be described with reference to FIG. 5 and onward.

Figure 5:
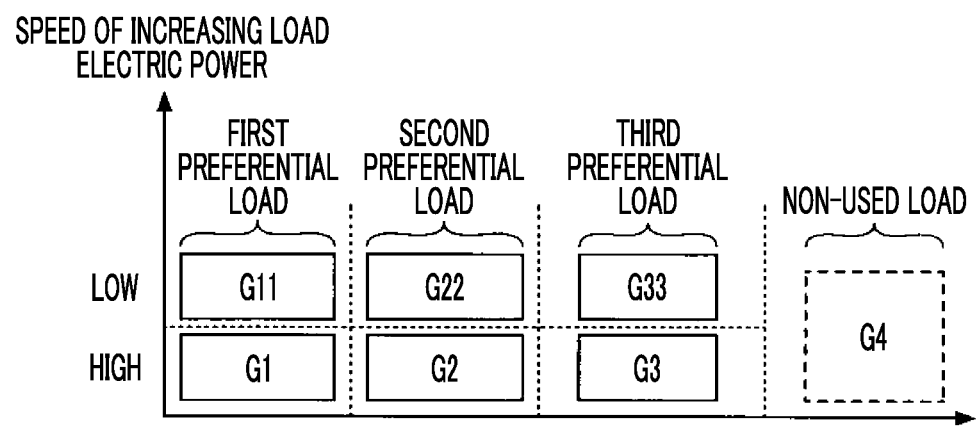
FIG. 5 is a diagram illustrating one example of classifying an electrical load group according to characteristics.

FIG. 5 is a diagram illustrating one example of classifying the electrical load group 10 according to characteristics. In FIG. 5, the vertical axis denotes a speed (responsiveness) of reaching an increase in load electric power. The speed of increasing the load electric power is lower on the upper side of FIG. 5.

In FIG. 5, each load of the electrical load group 10 is classified into first preferential loads G1, G11, second preferential loads G2, G22, third preferential loads G3, G33, and a non-used load G4.

The first preferential loads G1, G11 are loads that are valid to have an increase in electric power consumption (for example, loads with which increasing electric power consumption can increase comfort), and are loads of which the behavior caused by an increase in electric power consumption is not easily noticed by the occupant (that is, loads of which the behavior at the time of increase in electric power consumption is not easily noticed by the occupant). Thus, the first preferential loads G1, G11 are loads that are most suitable for use in the load electric power increasing process. The first preferential loads G1, G11 may include, for example, a cooling fan for cooling the lithium ion battery 22.

The second preferential loads G2, G22 are loads that are not valid to have an increase in electric power consumption, but the behavior thereof caused by an increase in electric power consumption is not easily noticed by the occupant in a front seat or a backseat (that is, loads of which the behavior at the time of increase in electric power consumption is not easily noticed by the occupant in the front seat or the backseat). Thus, the second preferential loads G2, G22 are loads that are suitable for use in the load electric power increasing process. The second preferential loads G2, G22 may include, for example, a defogger.

The third preferential loads G3, G33 are loads that are not valid to have an increase in electric power consumption, but the behavior thereof caused by an increase in electric power consumption is not easily noticed by the occupant in the front seat (loads of which the behavior caused by an increase in electric power consumption is easily recognized by the occupant in the backseat). Thus, the third preferential loads G3, G33 are loads that are suitable to a certain degree for use in the load electric power increasing process. The third preferential loads G3, G33 include an air conditioning device for the backseat or a seat heater for the backseat.

The non-used load G4 is a load of which the behavior caused by an increase in electric power consumption is easily noticed by the occupant in the front seat.

The classification of the first preferential loads G1, G11, the second preferential loads G2, G22, the third preferential loads G3, G33, and the non-used load G4 is stored as a load characteristic map in the storage unit 77. In such a case, the electric power consumption increasing controller 76 can perform the load electric power increasing process based on the pre-malfunction regenerative electric power Pr0, the post-malfunction regenerative electric power Pr1, and the load characteristic map.

Figure 6A:
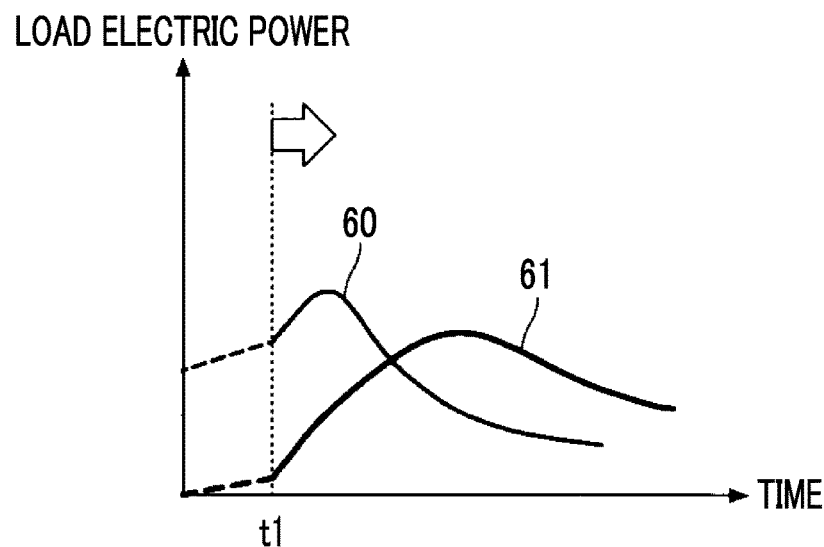
FIG. 6A is a descriptive diagram of a load electric power increasing process that uses a load characteristic map in FIG. 5.
Figure 6B:
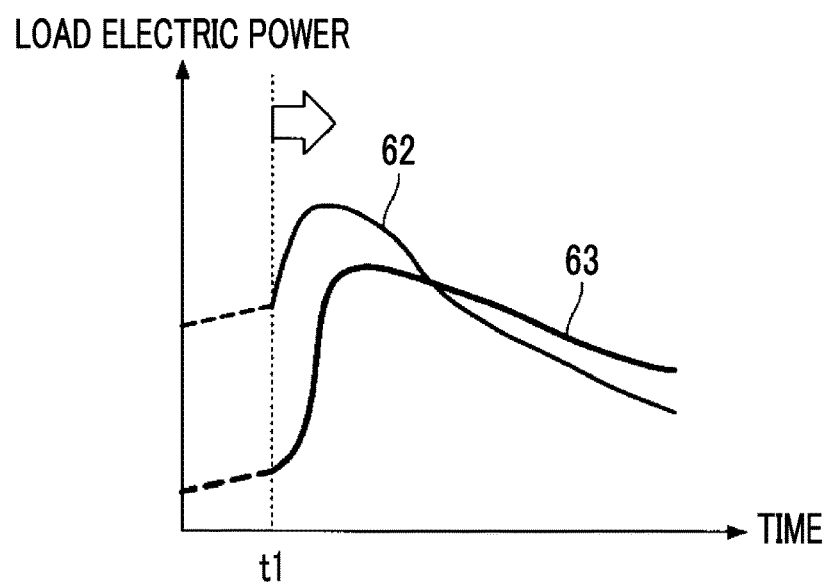
FIG. 6B is a descriptive diagram of the load electric power increasing process that uses the load characteristic map in FIG. 5.

FIG. 6A and FIG. 6B are descriptive diagrams of the load electric power increasing process that uses the load characteristic map in FIG. 5, and illustrate a characteristic of change in load electric power caused by the load electric power increasing process with the horizontal axis denoting time and the vertical axis denoting the load electric power.

The example illustrated in FIG. 6A illustrates an increase in the electric power consumptions of the first preferential loads G1, G11 caused by the load electric power increasing process when the lithium battery charging impeding event is detected at time t1 in the regenerative state. In FIG. 6A, the electric power consumption of the first preferential load G1 that has a high speed of increasing the load electric power is illustrated by a curve 60. The electric power consumption of the first preferential load G11 that has a low speed of increasing the load electric power is illustrated by a curve 61. By using the difference in the speed of increasing the load electric power, a change in regenerative electric power caused by the lithium battery charging impeding event can be reduced throughout the regenerative state after detection of the lithium battery charging impeding event.

The example illustrated in FIG. 6B illustrates an increase in the electric power consumptions of the first preferential loads G1, G11 and the second preferential loads G2, G22 caused by the load electric power increasing process when the lithium battery charging impeding event is detected at time t1 in the regenerative state. In FIG. 6B, the total electric power consumption of the first preferential load G1 and the second preferential load G2 that have a high speed of increasing the load electric power is illustrated by a curve 62. The total electric power consumption of the first preferential load G11 and the second preferential load G22 that have a low speed of increasing the load electric power is illustrated by a curve 63. When the difference between the pre-malfunction regenerative electric power Pr0 and the post-malfunction regenerative electric power Pr1 is comparatively large, a change in regenerative electric power caused by the lithium battery charging impeding event can be reduced throughout the regenerative state after detection of the lithium battery charging impeding event, by using the second preferential loads G2, G22 in addition to the first preferential loads G1, G11.

Figure 7:
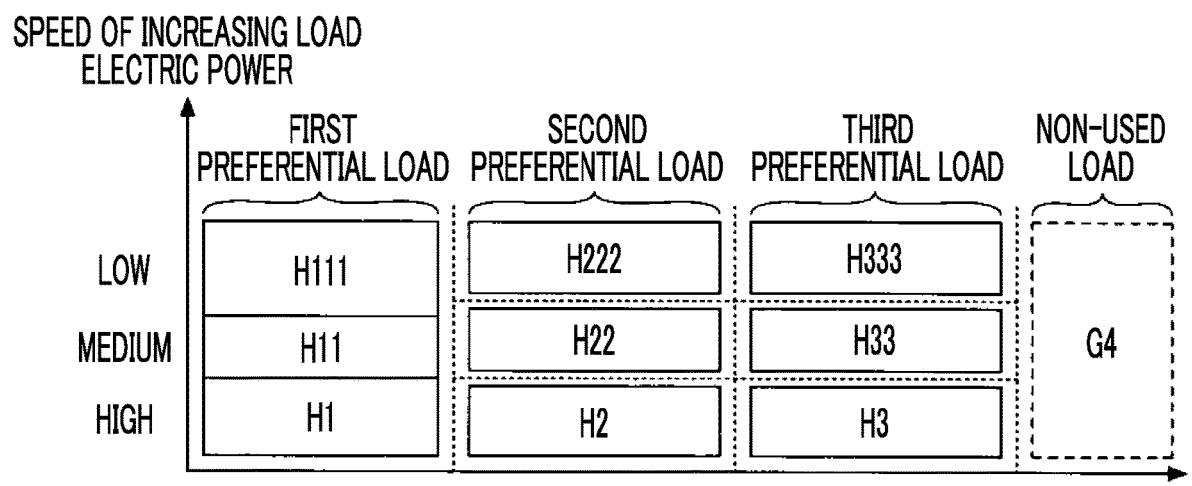
FIG. 7 is a diagram illustrating one example of classifying an electrical load group according to characteristics.
Figure 8:
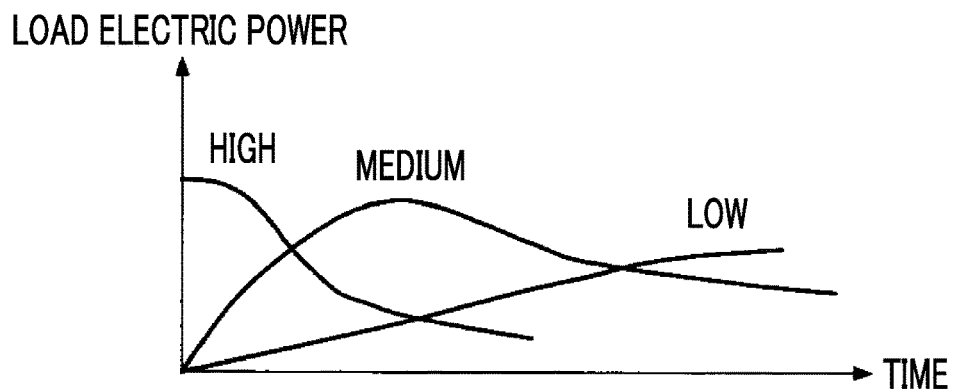
FIG. 8 is a descriptive diagram of a state of a rise in electric power consumption (the speed of increasing load electric power)

FIG. 7 is a diagram illustrating one example of classifying the electrical load group 10 according to characteristics. In FIG. 7, the vertical axis denotes a speed of increasing the load electric power (responsiveness). The speed of increasing the load electric power is lower on the upper side of FIG. 7. In FIG. 7, the speed of increasing the load electric power is divided into three levels unlike in FIG. 5. FIG. 8 schematically illustrates a state of a rise in electric power consumption (the speed of increasing the load electric power) with the horizontal axis denoting time and the vertical axis denoting the load electric power. FIG. 8 illustrates each characteristic of the three levels ("high", "medium", and "low").

In FIG. 7, each load of the electrical load group 10 is classified into first preferential loads H1, H11, H111, second preferential loads H2, H22, H222, third preferential loads H3, H33, H333, and the non-used load G4.

The first preferential loads H1, H11, H111 are loads that are valid to have an increase in electric power consumption (for example, loads with which increasing electric power consumption can increase comfort), and are loads of which the behavior caused by an increase in electric power consumption is not easily noticed by the occupant. Thus, the first preferential loads H1, H11, H111 are loads that are most suitable for use in the load electric power increasing process.

The first preferential load H1 is, for example, a load of which the electric power consumption is set to a save mode (sleep mode). The first preferential load H11 is, for example, the cooling fan for cooling the lithium ion battery 22. The first preferential load H111 is a load that operates intermittently.

The second preferential loads H2, H22, H222 are loads that are not valid to have an increase in electric power consumption, but the behavior thereof caused by an increase in electric power consumption is not easily noticed by the occupant in the front seat or the backseat. Thus, the second preferential loads H2, H22, H222 are loads that are suitable for use in the load electric power increasing process.

The second preferential load H2 is, for example, the defogger. The second preferential load H22 is, for example, a door lock actuator (relocking operation) or a power window motor. The second preferential load H222 is a radar device such as a millimeter wave radar.

The third preferential loads H3, H33, H333 are loads that are not valid to have an increase in electric power consumption, but the behavior thereof caused by an increase in electric power consumption is not easily noticed by the occupant in the front seat (loads of which the behavior caused by an increase in electric power consumption is easily recognized by the occupant in the backseat). Thus, the third preferential loads H3, H33, H333 are loads that are suitable to a certain degree for use in the load electric power increasing process.

The third preferential load H3 is, for example, the seat heater for the backseat. The third preferential load H33 is, for example, a camera for monitoring the proximity or the air conditioning device for the backseat. The third preferential load H333 is, for example, an air cleaning system for the front seat and the backseat.

The classification of the first preferential loads H1, H11, H111, the second preferential loads H2, H22, H222, the third preferential loads H3, H33, H333, and the non-used load G4 is also stored as a load characteristic map in the storage unit 77. In such a case, the electric power consumption increasing controller 76 can perform the load electric power increasing process based on the pre-malfunction regenerative electric power Pr0, the post-malfunction regenerative electric power Pr1, and the load characteristic map.

Figure 9:
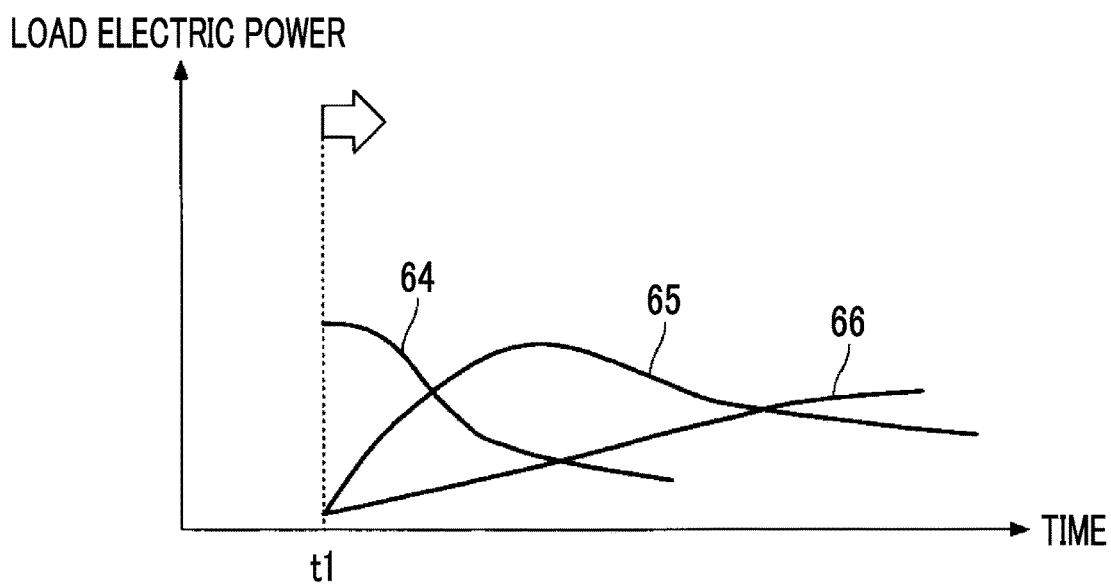
FIG. 9 is a descriptive diagram of the load electric power increasing process that uses a load characteristic map in FIG. 7.

FIG. 9 is a descriptive diagram of the load electric power increasing process that uses the load characteristic map in FIG. 7, and illustrates a characteristic of change in load electric power caused by the load electric power increasing process with the horizontal axis denoting time and the vertical axis denoting the load electric power.

The example illustrated in FIG. 9 illustrates an increase in the electric power consumptions of the first preferential loads H1, H11, H111 caused by the load electric power increasing process when the lithium battery charging impeding event is detected at time t1 in the regenerative state. In FIG. 9, the electric power consumption of the first preferential load H1 that has a "high" speed of increasing the load electric power is illustrated by a curve 64. The electric power consumption of the first preferential load H11 that has a "medium" speed of increasing the load electric power is illustrated by a curve 65. The electric power consumption of the first preferential load H111 that has a "low" speed of increasing the load electric power is illustrated by a curve 66. By using a smaller difference in the speed of increasing the load electric power than in FIG. 5, a change in regenerative electric power caused by the lithium battery charging impeding event can be reduced throughout the regenerative state after detection of the lithium battery charging impeding event.

While the electric power consumptions of the first preferential loads H1, H11, H111 are increased in the example illustrated in FIG. 9, the present disclosure is not limited thereto. When it is predicted that the regenerative period after the lithium battery charging impeding event is short, based on, for example, the engine rotational speed at the time of detection of the lithium battery charging impeding event, the electric power consumption of the first preferential load H1 may be increased among the first preferential loads H1, H11, H111.

Figure 10:
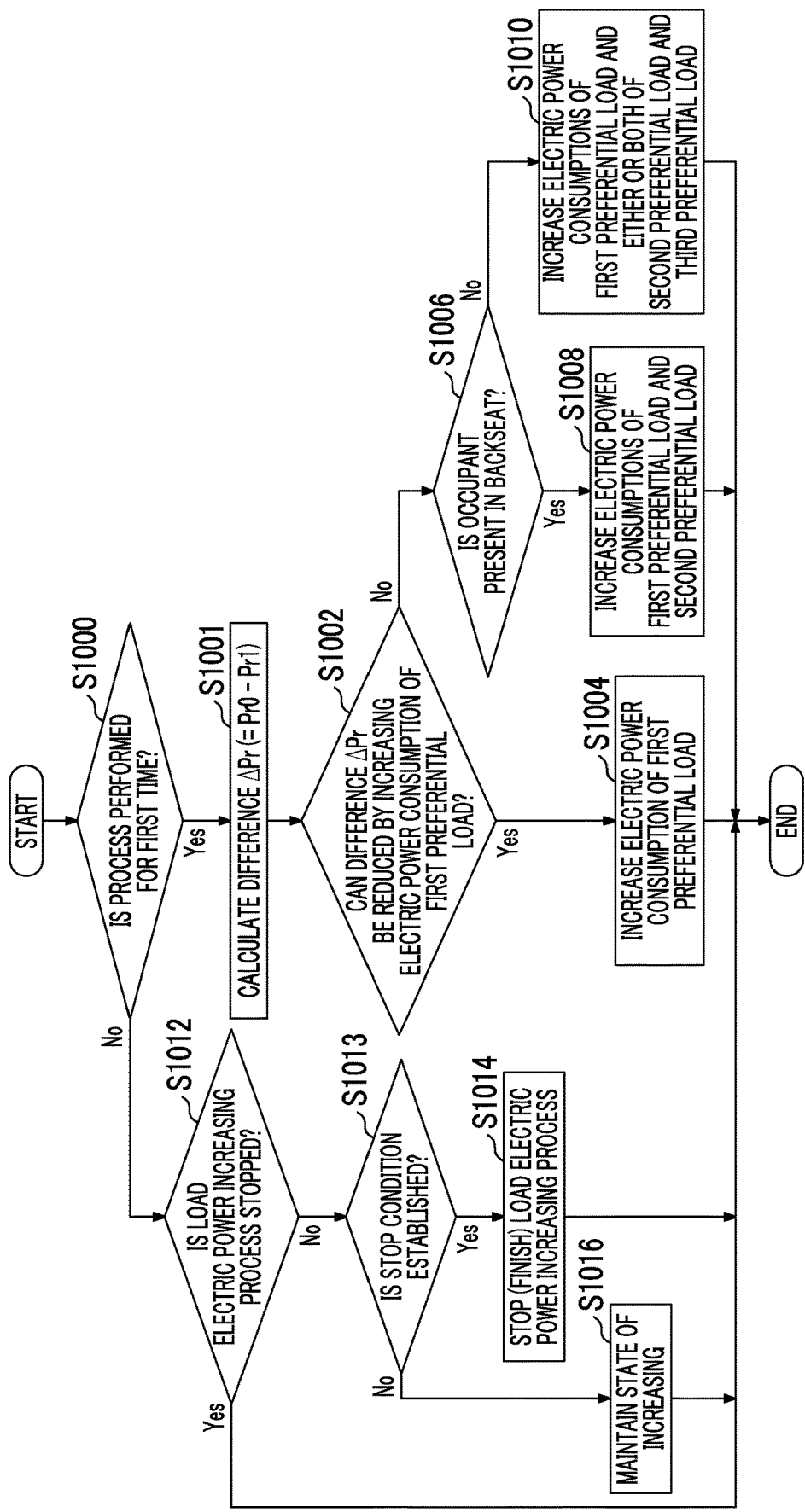
FIG. 10 is a schematic flowchart illustrating one example of the load electric power increasing process that uses the load characteristic map.

FIG. 10 is a schematic flowchart illustrating one example of the load electric power increasing process that uses the load characteristic map. The process illustrated in FIG. 10 can be realized as the process of step S320 in FIG. 3. While the load characteristic map illustrated in FIG. 7 is illustratively used here, the load characteristic map illustrated in FIG. 5 may also be used.

In step S1000, the electric power consumption increasing controller 76 determines whether or not the process is performed for the first time (a process period in which the load electric power increasing flag F2 is set to "1").

In step S1001, the electric power consumption increasing controller 76 calculates a difference $\Delta Pr$ ($=Pr0-Pr1$) between the pre-malfunction regenerative electric power Pr0 and the post-malfunction regenerative electric power Pr1.

In step S1002, the electric power consumption increasing controller 76 determines whether or not the difference $\Delta Pr$ can be reduced by increasing the electric power consumptions of the first preferential loads H1, H11, H111. Specifically, the electric power consumption increasing controller 76 calculates an increasable electric power consumption $\Delta PH1$ based on the current states of the first preferential loads H1, H11, H111, and determines whether or not electric power consumption $\Delta PH1 \geq$ difference $\Delta Pr$ is established. When the first preferential loads H1, H11, H111 are currently in operation, the increasable electric power consumption $\Delta PH1$ is equal to zero. The electric power consumption $\Delta PH1$ can be calculated based on the electric power consumption characteristics (for example, rated electric power consumptions) of the first preferential loads H1, H11, H111. When the determination result is "YES" in step S1002, a transition is made to step S1004. Otherwise, a transition is made to step S1006.

In step S1004, the electric power consumption increasing controller 76 increases the electric power consumptions of the first preferential loads H1, H11, H111.

In step S1006, the electric power consumption increasing controller 76 determines whether or not the occupant is present in the backseat. The determination as to whether or not the occupant is present in the backseat can be performed based on a seat sensor for the backseat, the opening or closing of a door switch of a rear door when the occupant rides on the vehicle, and the like. When the determination result is "YES" in step S1006, a transition is made to step S1008. Otherwise, a transition is made to step S1010.

In step S1008, the electric power consumption increasing controller 76 increases the electric power consumptions of the first preferential loads H1, H11, H111 and the second preferential loads H2, H22, H222. In step S1010, the electric power consumption increasing controller 76 increases the electric power consumptions of the first preferential loads H1, H11, H111, and increases the electric power consumptions of either or both of the second preferential loads H2, H22, H222 and the third preferential loads H3, H33, H333.

In step S1012, the electric power consumption increasing controller 76 determines whether or not the load electric power increasing process is stopped. The load electric power increasing process is stopped by subsequent step S1014. When the determination result is "YES" in step S1012, the current cycle of the process is finished. Otherwise, a transition is made to step S1013.

In step S1013, the electric power consumption increasing controller 76 determines whether or not a stop condition for the load electric power increasing process is established. The stop condition for the load electric power increasing process is satisfied in a state in which the regenerative electric power is sufficiently decreased due to a decrease in engine rotational speed, and in which continuing the load electric power increasing process may cause a current to be drawn from the lead battery 20. The stop condition for the load electric power increasing process may be satisfied, for example, when the engine rotational speed becomes lower than or equal to a predetermined threshold, or when the generated voltage (detected value) of the alternator 40 is significantly lower than the specified generated voltage. When the determination result is "YES" in step S1013, a transition is made to step S1014. Otherwise, a transition is made to step S1016.

In step S1014, the electric power consumption increasing controller 76 stops (finishes) the load electric power increasing process. That is, the electric power consumption increasing controller 76 releases the state of increasing the electric power consumption, and restores loads related to the load electric power increasing process to the original state (the state at the start of the load electric power increasing process). As described above, since the stop condition for the load electric power increasing process is satisfied in a stage in which the regenerative electric power is sufficiently decreased, deterioration of drivability due to a rapid change in regenerative electric power does not substantially occur even when the load electric power increasing process is stopped in the stage.

In step S1016, the electric power consumption increasing controller 76 maintains the state of increasing the electric power consumption.

According to the process illustrated in FIG. 10, the electric power consumptions of the third preferential loads H3, H33, H333 are increased in accordance with the state of the backseat. Thus, the load electric power increasing process can be realized in a manner that is not easily recognized by the occupant.

FIG. 11 is a schematic flowchart illustrating another example of the load electric power increasing process that uses the load characteristic map. The process illustrated in FIG. 11 can be realized as the process of step S320 in FIG. 3. While the load characteristic map illustrated in FIG. 7 is illustratively used here, the load characteristic map illustrated in FIG. 5 may also be used.

Step S1100, step S1101, step S1102, step S1104, step S1112, step S1113, step S1114, and step S1116 in FIG. 11 are respectively the same as step S1000, step S1001, step S1002, step S1004, step S1012, step S1013, step S1014, and step S1016 in FIG. 10 and thus, will not be described.

In step S1106, the electric power consumption increasing controller 76 calculates an increasable electric power consumption $\Delta PH2$ based on the current states of the second preferential loads H2, H22, H222, and determines whether or not electric power consumption $\Delta PH1+\Delta PH2 \geq$ difference $\Delta Pr$ is established. When the second preferential loads H2, H22, H222 are currently in operation, the increasable electric power consumption $\Delta PH2$ is equal to zero. The electric power consumption $\Delta PH2$ can be calculated based on the electric power consumption characteristics (for example, rated electric power consumptions) of the second preferential loads H2, H22, H222. When the determination result is "YES" in step S1106, a transition is made to step S1108. Otherwise, a transition is made to step S1110.

In step S1108, the electric power consumption increasing controller 76 increases the electric power consumptions of the first preferential loads H1, H11, H111 and the second preferential loads H2, H22, H222.

In step S1110, the electric power consumption increasing controller 76 increases the electric power consumptions of the first preferential loads H1, H11, H111, the second preferential loads H2, H22, H222, and the third preferential loads H3, H33, H333.

According to the process illustrated in FIG. 10, when the difference $\Delta Pr$ cannot be reduced by increasing the electric power consumptions of the first preferential loads H1, H11, H111, such as when the difference $\Delta Pr$ is comparatively large, drivability is prioritized over avoiding noticing of an increase in electric power consumption by the occupant, and the second preferential loads H2, H22, H222 and the like are used. Accordingly, even when the difference $\Delta Pr$ cannot be reduced by increasing the electric power consumptions of the first preferential loads H1, H11, H111, such as when the difference $\Delta Pr$ is comparatively large, deterioration of drivability caused by the difference $\Delta Pr$ can be reduced.

While the embodiment is described in detail heretofore, the present disclosure is not limited to a specific embodiment. Various modifications and changes can be made. In addition, all or a plurality of constituent elements of the embodiment may be combined with each other.

For example, while the electric power calculation unit 74 in the embodiment calculates the load electric power based on information from the current sensor 304 and the voltage sensor 202, the present disclosure is not limited thereto. For example, the electric power calculation unit 74 may individually calculate the electric power consumption of each electrical load of the electrical load group 10 based on the state (in operation or not in operation) of each electrical load of the electrical load group 10 and the electric power consumption characteristic (for example, rated electric power consumption) of each electrical load. The electric power calculation unit 74 may calculate the load electric power by finding the total of the electric power consumption of each electrical load.

What is claimed is:

1. An electric power source system that is mounted in a vehicle, the electric power source system comprising: an electric power generator that is mechanically connected to an engine; a voltage conversion device that converts a direct current voltage; a high voltage battery in a high voltage system of the vehicle, the high voltage battery being electrically connected to the electric power generator through the voltage conversion device, the high voltage battery having a rated voltage of more than 12V;

a low voltage battery in a low voltage system of the vehicle, the low voltage battery being electrically connected to the electric power generator in a parallel relationship with the high voltage battery without passing through the voltage conversion device, the low voltage battery having a rated voltage of 12V;

an electrical load in the low voltage system of the vehicle, the electrical load being electrically connected to the electric power generator in a parallel relationship with the high voltage battery without passing through the voltage conversion device; and a control device configured to:

charge the high voltage battery through the voltage conversion device based on regenerative electric power in a regenerative state in which the regenerative electric power is generated by the electric power generator; and increase an electric power consumption of the electrical load further when the control device detects an event that impedes the charging in the regenerative state than when the control device does not detect the event;

wherein a plurality of the electric loads is disposed, and the control device is configured to: predict a regenerative period after the control device detects the event that impedes the charging in the regenerative state based on an engine rotational speed, and increase an electric power consumption of a predetermined electrical load that has a higher speed of increasing the electric power consumption among the plurality of the electrical loads when the control device predicts that the predicted regenerative period is shorter than a predetermined period.

2. The electric power source system according to claim 1, wherein the low voltage battery is a lead battery, and
the high voltage battery is a lithium ion battery.

3. The electric power source system according to claim 2, wherein a plurality of the electrical loads is disposed.

4. The electric power source system according to claim 3, wherein the electrical loads include a first electrical load having a predetermined first characteristic and a second electrical load having a predetermined second characteristic, the control device is configured to increase the electric power consumptions of the electrical loads in a manner that preferentially uses the first electrical load over the second electrical load when the control device detects the event in the regenerative state, and the first electrical load is a load of which a behavior at a time of increase in electric power consumption is less noticeable to an occupant than the second electrical load.

5. The electric power source system according to claim 4, wherein the second electrical load includes an air conditioning device for a backseat, a seat heater for the backseat, an air cleaning system for a front seat, or an air cleaning system for the backseat.

6. The electric power source system according to claim 1, wherein the electrical load consumes electric power under control of the control device.

7. The electric power source system according to claim 1, wherein the event includes a malfunction of the voltage conversion device or a malfunction of the high voltage battery.

8. The electric power source system according to claim 4, wherein the first electrical load includes a cooling fan for cooling the lithium ion battery.

* * * * *